(12) United States Patent
Fraser (10) Patent No.: US 8,550,410 B2
(45) Date of Patent: Oct. 8, 2013

(54) MOBILE ELECTRONIC DEVICE (MED) MOUNTING AND POSITIONING BRACKET ASSEMBLY

(71) Applicant: William A Fraser, Sugar Land, TX (US)

(72) Inventor: William A Fraser, Sugar Land, TX (US)

( * ) Notice: Subject to any disclaimer, the term of this patent is extended or adjusted under 35 U.S.C. 154(b) by 0 days.

(21) Appl. No.: 13/628,045

(22) Filed: Sep. 27, 2012

(65) Prior Publication Data

US 2013/0020363 A1 Jan. 24, 2013

(51) Int. Cl.
*G12B 9/00* (2006.01)

(52) U.S. Cl.
USPC ............... 248/27.1; 248/205.1; 248/213.2; 248/220.21; 248/231.9; 248/300; 248/309.1; 248/314

(58) Field of Classification Search
CPC ...................................................... B60K 37/04
USPC .......... 248/27.1, 205.1, 213.2, 220.21, 231.9, 248/300, 309.1, 314, 200; 116/62.1, 62.4, 116/305; 73/431
See application file for complete search history.

(56) References Cited

U.S. PATENT DOCUMENTS

| | | | | |
|---|---|---|---|---|
| 4,080,570 | A * | 3/1978 | Pearson | 324/156 |
| 4,723,792 | A * | 2/1988 | Sakamoto et al. | 280/751 |
| 4,939,934 | A * | 7/1990 | Ritzenthaler et al. | 73/431 |
| 5,230,495 | A * | 7/1993 | Brackus | 248/300 |
| 5,588,055 | A | 12/1996 | Williamson et al. | |
| 5,676,338 | A * | 10/1997 | Warda et al. | 248/27.1 |
| 5,678,793 | A | 10/1997 | Hill | |
| 5,813,583 | A * | 9/1998 | Benedeti | 224/483 |
| 6,076,777 | A | 6/2000 | Farm | |
| 6,138,969 | A * | 10/2000 | Olausson | 248/222.52 |
| 6,441,872 | B1 * | 8/2002 | Ho | 348/837 |
| 6,926,116 | B2 * | 8/2005 | Shea | 181/150 |
| 7,446,675 | B2 * | 11/2008 | Dutton | 340/945 |
| 7,472,940 | B2 * | 1/2009 | Sullivan | 296/72 |
| 7,735,785 | B2 * | 6/2010 | Wippler et al. | 248/27.1 |
| 7,789,349 | B2 * | 9/2010 | Bethel | 248/27.1 |
| 8,041,029 | B2 | 10/2011 | Wiegers | |
| 8,233,269 | B2 * | 7/2012 | Hotary et al. | 361/679.01 |
| 8,274,783 | B2 * | 9/2012 | Polizzotto et al. | 361/679.01 |
| 2002/0074473 | A1 * | 6/2002 | Behar | 248/300 |
| 2004/0159748 | A1 * | 8/2004 | Beausoleil | 248/27.1 |
| 2004/0242285 | A1 | 12/2004 | Farshi | |
| 2007/0145219 | A1 | 6/2007 | Lin | |
| 2009/0250570 | A1 | 10/2009 | Corn et al. | |
| 2010/0264276 | A1 * | 10/2010 | Wippler et al. | 248/27.1 |
| 2010/0264284 | A1 | 10/2010 | Lai | |

OTHER PUBLICATIONS

TTinCT, GPS mount solution in 911, Pelican Parts, Jul. 13, 2008, p. 1,2, website, Harbor City, California, U.S.A.
ModShack TTuned GadgeTT Instructions; (Undated); Hand written notes from seller; (sent with PayPal Transaction Details—next reference).
PayPal Transaction Details; ModSchack TTuned, May 29, 2009.

* cited by examiner

*Primary Examiner* — Terrell McKinnon
*Assistant Examiner* — Michael McDuffie
(74) *Attorney, Agent, or Firm* — Law Office of Stephen P. Krupp, PLLC (57) ABSTRACT

A novel bracket assembly enables secure retrofit mounting and positioning of a mobile electronic device (MED) such as smart phone, portable GPS navigation appliance, iPod/MP3 player, or satellite radio to an ideal, driver-convenient locale. The vehicle-specific bracket system design provides for easy driver-line-of-sight device-interaction without causing interference with vehicle operation, windshield visibility, ventilation, or switch controls.

20 Claims, 11 Drawing Sheets

MOBILE ELECTRONIC DEVICE (MED) MOUNTING AND POSITIONING BRACKET ASSEMBLY

BACKGROUND OF THE INVENTION

A number of alternative, general purpose attachment schemes and hardware designs have been developed for mounting MEDs within vehicles. These approaches have attempted to provide universal, fit-any-vehicle, MED mount designs. Suction cup installations have been used for securing MED docking holders to windshield, dashboard, or other mounting surfaces. This approach can provide some limited positioning flexibility but mounting surfaces need to be flat and smooth and, invariably, suction integrity degrades over time and the MED mount can fall from its mount installation surface. Suction based mounts positioned on the vehicle's smooth surface windshield can be reasonably durable but this MED placement, however, can seriously interfere with driver visibility in a small car like the classic Porsche 911, (Porsche® is a registered trademark of Dr. Ing. h.c. F. Porsche AG.). Adhesives and/or invasive fasteners have been used to secure MED mounting, but these approaches can irreversibly mar/damage vehicle mounting surfaces (e.g. the dashboard covering) with visible, conspicuous residues or holes. Velcro attachment of MEDs requires surface marring adhesive and installations can look, aesthetically, rather unfinished and crude. Clip based mounts are limited by available attachment points and often, what's workable ends up positioning the MED in an awkward location. Weighted, conformable bases have been used to secure MED mounting by friction to the top of a vehicle's dashboard but, this approach requires a large bulky base that can also seriously impede driver vision in a small car like the classic 911 Porsche. Under dashboard brackets have been tried in the classic Porsche 911 but, these installations generally place the MED too low in the cabin for acceptable device visibility and/or interactive convenience and furthermore, this positioning can compromise operating performance of the MED e.g. degraded GPS navigation capability or deficient phone functionality due to shielded signal strength. Vehicle-specific MED mounting brackets have been designed to attach onto the center dashboard vent in the classic Porsche 911, but this approach can impair cabin ventilation. Bracket insertion between the perimeter of this vent and the dashboard surface can result in cracking the plastic vent grille.

The Porsche 911 is an iconic example of excellence in automotive design. The basic shape and styling contours of today' latest version of the 911, the 2012 991, make it instantly recognizable as a worthy descendant of Ferry Porsche's original 1963 design (produced in 1964, commercialized in 1965). The nearly fifty year durability of the vehicle's aesthetics and underlying engineering framework are testimony to the market potency of good design, performance, and functionality.

While basic body form and power train layout have lasted throughout Porsche 911 production life, major advances and refinements were implemented with every new model along the way. Across the development history of the Porsche 911, a major styling and engineering demarcation took place in 1999 with the commercialization of the 996 model, the first generation water cooled engine powered Porsche 911. From 1965 through 1998, the air cooled, flat six engine defined the original or now "classic" phase of the vehicle.

The interior design of the classic 911 remained substantially unchanged for thirty three years finally giving way to major revision with the introduction of the 996 model. Drivers of the earliest 911s would feel completely at home in the "end-of-era," air cooled 993s of the late 1990s. Some ergonomic modifications of certain switch locations were implemented over the years and improved cabin ventilation was achieved with added air grilles to the dashboard structure, but driver-interaction with the readouts and controls of the car was grounded in preserved familiarity.

While dashboard form and instrument layout were kept intact throughout the evolutionary development of the air cooled 911, both active and passive functionality at the driver/car interface advanced, continuously, with new improved electronics, sensor readouts, and safety features such as integrated airbag systems. The simplicity of the classic Porsche 911 dashboard design carried some ergonomic quirks for new drivers with certain controls better managed by feel than sight. Nonetheless, a little drive-time tended to quickly erase any initial awkwardness in operating the vehicle.

When development of the air cooled cars was discontinued with the transition from the 993 to the water cooled 996, major engineering changes were accompanied by some major styling changes, especially to the interior. The familiar, classic 911 dashboard was abandoned. A new overlapping instrument cluster layout was implemented and the center console now penetrated up into the dashboard structure and was designed to accommodate new electronics. As the 911 continued to evolve, new electronic capability was offered such as a satellite navigation system, mobile phone controls, and digital music functionality. GPS capability, phone integration, and iPod/mp3 player (iPod® is a trademark of, a copyright of, and made by Apple, Inc.) connectivity made the new 911 interior seem luxurious and modern in comparison to the relatively spare, austere, and dated cabin of the classic air cooled 911s.

This new dashboard configuration incited controversy among some hardcore Porsche enthusiasts who felt purity of design and distinctiveness had been shamefully sacrificed and that the 911 interior now had a look and feel common to a luxury sedan rather than a high performance sports car. Nonetheless, its modern communication management conveniences had major appeal to "daily-driver" and "adventure-road-trip" owners and, for some, made the "raw" classic 911 seem like a weekend-only car.

SUMMARY OF THE INVENTION

The background outlined above helps explain the utility and demand-side rationale for the invention outlined in this disclosure. The value proposition for this product for an end-use customer (the owner and/or driver of a classic air cooled Porsche 911) is that the MED mounting and positioning bracket provides a simple, affordable, purpose-designed, attractive, non-invasive pathway to very significantly upgrade the electronic communications functionality and convenience of the classic Porsche 911. MED mounting using this invention provides for a modernized driver experience that can include GPS navigation and phone connectivity to the world as well as the ability to integrate one's full library of digital music with the classic 911's audio system. The classic Porsche 911 sports car can be transformed with enhanced communications management capability to deliver a modern, convenient travelling experience to its devoted ownership enthusiasts.

GPS navigation capability, in particular, has become an increasingly desired option for new vehicles. In many luxury models, navigation assistance has evolved to become an expected integrated feature, not an à la carte, add-on vehicle option. Nonetheless, if not factory installed as an OEM (original equipment manufacturer) integrated device, a number of companies have developed and marketed portable, after-market GPS navigation appliances that can be retrofit to vehicles (old and new) to deliver excellent navigation capability. As noted above, however, positioning these MEDs in a driver convenient location has led to a number of general purpose and occasionally, vehicle-specific hardware designs and attachment schemes for mounting these devices with limited levels of success. For the classic Porsche 911, the MED mounting and positioning challenge is exacerbated by the small size of the passenger cabin and the near absence of useable flat surfaces and workable attachment points. The novel invention described herein solves the problem of placing and securing an MED such as a portable GPS navigation appliance in a driver-convenient position in the classic Porsche 911. This invention creates a very stable and secure MED mounting surface platform in an ergonomically ideal location without conflicting with vehicle controls, driver visibility, or cabin ventilation.

A very important companion aspect driving the need for this invention resides in the coincident market acceleration underway with respect to the expanding prevalence of multi-function smartphones and their ever increasing "apps" functionality which enables people to stay fully connected to the world, wherever they may be. The ability to utilize this removable MED, hands-free, in a vehicle can largely replicate the convenience of very expensive, "at-your-fingertips," in-dash installations of navigation, phone, and digital music systems. Smartphone "apps" have become increasingly powerful and sophisticated with feature offerings that can match and often exceed the usability of "high-end," onboard music and communication management systems. "Apps" have been developed to transform a phone screen to a customizable, menu-accessed, digital dashboard with notification readouts for GPS-calculated-speed, vehicle location, elevation, compass direction, weather updates, traffic congestion, etc. and driver driven capabilities for destination navigation, phone connectivity, and digital music management.

Smartphone capability and functionality are creating a cyber-connectivity dependency in the public at large and represent an important indirect driver of demand for the customized MED mounting and positioning bracket described in this disclosure. Classic Porsche 911 owners (who most likely have smart phones) will place high value in having ready, convenient, safe access to certain features, especially navigation assistance, provided by this amazing MED. Vehicle driving convenience will be significantly upgraded.

In one embodiment, the invention is a non-invasive, secure, stable attachment device for mounting a mobile electronic device (MED) to a dashboard of a vehicle without requiring surface marring adhesives or drilling of holes, said device comprising:

a) a bracket assembly securing two-end, mechanical anchoring of a MED mounting platform to the dashboard,
b) a first dashboard fastening mechanism for one end of the bracket assembly which uses pressure and friction achieved by sandwiching the bracket assembly between a flange of at least one cylindrical vehicle instrument and a face of an instrument housing panel of the vehicle, said flange being created by a bezel rim of the instrument and lip of a circumferential ribbed rubber boot used in press fitting and holding the instrument securely in a circular opening in the vehicle's instrument housing panel, preferably wherein the fastening mechanism is an annular ring of the bracket assembly and fit to a clock in a left-hand drive vehicle or to a fuel level, oil level gauge in a right hand drive vehicle,
c) a second fastening mechanism for the end of the bracket assembly opposite to the end used in b), which mechanically attaches a bracket support arm or brace connecting the bracket assembly to the dashboard and/or dashboard frame using at least one pre-existing vehicle bolt, preferably wherein the bracket support arm or brace is mechanically attached to the vehicle dashboard or dashboard frame using a bolt, screw or rivet, and
d) a MED mounting platform configured with a hole or pattern of holes to accept various adaptor plates and connector mechanisms to attach to MEDs and/or device holders/cradles.

The first dashboard fastening mechanism of the bracket assembly can be an annular ring and fit to a clock, or a fuel level gauge and/or oil level gauge of the vehicle. The MED mounting platform can be fitted with a spacer wedge increasing platform canting relative to a major horizontal axis of the dashboard. The bracket assembly can be removable from the vehicle without evidence of prior installation. The MED mounting mechanism can be coupled to and/or removable from a portable MED. The MED or the MED docking holder or cradle can be hardwired to an electronic system of the vehicle. The hardwiring preferably powers the MED and/or enables sound interaction using an integrated audio component of the vehicle, especially for navigation appliances, mobile phones and/or digital music players.

In a second embodiment, the invention is a bracket assembly for mounting, positioning, and supporting a mobile electronic device (MED) in a vehicle, the bracket assembly comprising:

a) an annular ring for securing the bracket assembly to an instrument of an instrument housing panel of the vehicle,
b) a plate contiguous and/or connected to the annular ring that conforms to design contours and configuration of a dashboard of the vehicle,
c) a cantilevered extension contiguous and/or connected to the plate for sideward positioning of MED placement,
d) a MED mounting platform contiguous and/or connected to the cantilevered extension, and
e) a support arm connecting the bracket assembly to the dashboard or dashboard frame of the vehicle to brace the MED mounting platform, reinforce bracket stability, constrain bracket movement, and dampen vibration of the mounted MED.

The instrument housing panel can comprise at least one circular opening to accommodate a cylindrical vehicle instrument.

The annular ring of the bracket assembly, preferably, is concentrically fit to the circumference of at least one cylindrical vehicle instrument and sits behind a protruding rim or flange feature of said instrument and is held securely to the face of the instrument housing panel by pressure and friction created when the cylindrical vehicle instrument with flange is pressed into a circular opening in the instrument housing panel. The annular ring sits behind the protruding rim or flange of the instrument in the sense that the ring is located between the instrument outer bezel, a collar-like gasket (usually an elastomeric material such as rubber, such as the lip of the ribbed rubber boot shown in the figures herein) and the instrument housing panel itself, when the instrument is reinstalled. Thus, the preferred order of the components when installed according to the invention herein, moving from the interior of the vehicle forward toward the windshield, is: instrument, instrument bezel, rubber boot lip, annular ring of the bracket assembly, and then the face of the instrument housing panel itself. The annular ring of the bracket assembly is located concentrically on top of the collar-like gasket (for example, the ribbed rubber boot) surrounding the instrument; that is, the annular ring is "sandwiched" between the gasket-creating flange and the instrument housing panel. If no such gasket-creating flange pre-exists on the instrument then a suitable flange should be installed in front of (and under if appropriate) the annular ring, such that the annular ring of the invention is tightly "squeezed" between the gasket-creating flange and the instrument housing panel when installed. If not originally present, the gasket-creating flange can be added in the form of an "o-ring" in a suitable size to fit tightly, at least partially, preferably concentrically, around the instrument. To further stabilize the bracket installation, an "o-ring" of suitable size can also be added behind the annular ring of the bracket, between it and the instrument housing panel. The instrument also need not be circular, but can be polygon in face shape, for example, elliptical or angular (such as rectangular or square) in shape. A flexible gasket, if not present, can be added in this instance as well. Such a gasket or flange can be an "o-ring," stretched to fit, or can be an elastomeric material aligned in place in a similar fashion to that described above. In the case of a non-circular instrument, then the annular ring described in the invention would be modified to fit the instrument in question. That is, the "annular ring" may not be circular in face projection, but could be a polygon in face shape, for example, elliptical or a shape appropriate for the application.

In addition, the annular ring of the bracket can be installed between the instrument bezel and lip of the ribbed rubber boot (i.e. behind the bezel and in front of the collar-like gasket). It can also be installed without using a collar-like gasket or flange. That is, the annular ring can be "sandwiched" directly between the instrument bezel and the instrument housing panel face. In either case, with or without the gasket, with the annular ring contacting, directly, the instrument's outer surface circumference, the annular ring must be sized appropriately. The annular ring must be sized such that the inner diameter of the annular ring is within a tight tolerance of the outer diameter of the instrument, less than and usually no more than from about 0.5 to about 1.25 percent of the outer diameter of the instrument. For example, if the instrument is about 80 mm in outer diameter, then the inner diameter of the annular ring should be no more than about 81 mm, or within about 1.25 percent. Utilizing a tight tolerance between the outer diameter of the instrument and the inner diameter of the annular ring is important to avoid migration displacement (e.g. rotation) of the annular ring and bracket assembly after installation. Vehicle motion caused vibration, road condition jarring, and the like, can all contribute to potential unwanted movement of the MED mounting and bracket assembly, if not properly designed and installed. An improperly designed annular ring with excessive inner diameter can result in the bracket assembly actually dislodging from the installation by slipping off the instrument housing panel over the front of the instrument bezel. Obviously, the outer diameter of the annular ring can vary somewhat, but it would be desirable for it to be somewhat smaller to minimally larger than either the outer diameter of the instrument bezel or lip of the ribbed rubber boot (if present) for aesthetic purposes.

Finally, the annular ring need not be a complete uninterrupted piece of structure (such as a perfect uninterrupted "O." The annular ring could be a partial ring, with a gap or two (or more) present, if convenient for installation and/or aesthetics. However, a completely concentric, uninterrupted annular ring is preferable, especially for secure mounting and installation.

The annular ring of the bracket assembly can be fit to a clock or fuel level gauge and/or an oil level gauge of the vehicle. Fitting the annular ring to the clock is preferable in left-hand drive vehicles, while fitting the annular ring to the fuel level and oil level gauge is preferable in right hand drive vehicles.

The cantilevered extension can position the MED mounting platform in an unobstructed, line-of-sight location for a driver of the vehicle. The MED mounting platform can be configured with a hole or pattern of holes to accept adaptor connectors for attaching various MEDs and/or MED docking holders/cradles. The MED mounting platform can be fitted with a spacer wedge to increase platform canting relative to a major horizontal axis of the dashboard.

The MED can be a variety of devices, mostly electronic, typically a mobile telephone, portable GPS navigation appliance, digital music player, satellite radio, or some combination thereof. The MED is preferably hardwired to the electronic systems of the vehicle, especially for mobile telephones or digital music players, for powering the MED and/or sound interaction using the vehicle's integrated audio components. The device can also be a mechanical device, such as a cup holder.

The device can have a MED mounting mechanism configured to allow, optionally, easy coupling and easy removal of a portable MED. The device can include a MED mounting platform to accept various adaptor plates and/or connector mechanisms attached to MEDs and/or device holders/cradles. The bracket support arm or brace can be mechanically attached to the vehicle dashboard or dashboard frame using a bolt, screw or rivet.

In a third embodiment, the invention is a non-invasive, secure, stable attachment system for mounting a mobile electronic device (MED) to a dashboard of a vehicle without requiring surface marring adhesives or drilling of new holes, said system comprising:

a) a bracket assembly securing two-end, mechanical anchoring of a MED mounting platform to the dashboard, b) a first dashboard fastening mechanism for one end of the bracket assembly which uses pressure and friction achieved by sandwiching the bracket between the flange of at least one cylindrical vehicle instrument and the face of an instrument housing panel of the vehicle, said flange being created by the bezel rim of the instrument and lip of a circumferential ribbed rubber boot used in press fitting and holding the instrument securely in a circular opening in the vehicle's instrument housing panel, c) a second fastening mechanism for the opposite end of the bracket assembly which mechanically attaches a bracing support arm connected to the bracket to the dashboard and/or dashboard frame using at least one pre-existing vehicle bolt, and d) optionally, a MED mounting platform configured with a hole or pattern of holes to accept various adaptor plates and connector mechanisms to attach to MEDs and/or device holders/cradles.

The first dashboard fastening mechanism can comprise an annular ring for the bracket assembly, and is preferably fit to a clock for left-hand drive vehicles and preferably fit to a fuel level gauge and/or oil level gauge for right-hand drive vehicles. Where the MED mounting platform is not optional, it can be fitted with a spacer wedge to increase platform canting relative to the major horizontal axis of the dashboard.

The bracket assembly can be removable from the vehicle without evidence of prior installation. The bracket assembly can have a MED mounting mechanism or platform configured to allow, optionally, easy coupling and easy removal of a portable MED. The MED can be hardwired to at least one electronic system of the vehicle to power the MED and/or to provide sound interaction using integrated audio components of the vehicle. The bracket support arm or brace can be mechanically attached to the vehicle dashboard or dashboard frame using a bolt, screw or rivet.

In a fourth embodiment, the invention is a bracket assembly used to mount a mobile electronic device (MED) in a vehicle, the bracket assembly comprising:
  a) an annular ring integral to and securing the bracket assembly to an instrument housing panel of the vehicle,
  b) a plate contiguous and/or connected to the annular ring that conforms to a dashboard design contour and/or configuration of the vehicle,
  c) a cantilevered extension contiguous and/or connected to the plate for generally sideward positioning or placement of the MED,
  d) a MED mounting platform contiguous and/or connected to the cantilevered extension,
  e) wherein the annular ring is an anchoring point for the bracket assembly, and
  f) optionally, a support arm connecting and anchoring the bracket assembly to the dashboard or a dashboard frame of the vehicle.

In a fifth embodiment of the invention, in a bracket assembly used to mount a mobile electronic device (MED) in a vehicle, the bracket assembly comprising an annular ring integral to and securing the bracket assembly to an instrument housing panel of the vehicle, the improvement comprises:
  a) a plate contiguous and/or connected to the annular ring that conforms to a dashboard design contour and/or configuration of the vehicle,
  b) a cantilevered extension contiguous and/or connected to the plate for generally sideward positioning or placement of the MED,
  c) a MED mounting platform contiguous and/or connected to the cantilevered extension,
  d) wherein the annular ring is an anchoring point for the bracket assembly, and
  e) optionally, a support arm connecting and anchoring the bracket assembly to the dashboard or a dashboard frame of the vehicle.

In a yet another embodiment of the invention, in a bracket assembly used to mount a mobile electronic device (MED) in a vehicle, the bracket assembly comprising an annular ring integral to and securing the bracket assembly to an instrument housing panel of the vehicle, the improvement comprises connecting or attaching a plate to the annular ring that conforms to a dashboard design contour and/or configuration of the vehicle, and optionally, the bracket assembly comprising a cantilevered extension contiguous and/or connected to the plate for generally sideward positioning or placement of the MED. Preferably, the cantilevered extension is not optional in this embodiment.

In another embodiment of the invention, in a bracket assembly used to mount a mobile electronic device (MED) in a vehicle, the bracket assembly comprising an annular ring integral to and securing the bracket assembly to an instrument and an instrument housing panel of the vehicle, the improvement comprising connecting or attaching a plate to the annular ring, wherein the annular ring and the plate conforms to a dashboard design contour and/or configuration of the vehicle, sizing the annular ring such that the annular ring has an inner diameter less than and within 0.5 to about 1.25 percent of an outer diameter of the instrument, and optionally, the bracket assembly comprising a cantilevered extension contiguous and/or connected to the plate for generally sideward positioning or placement of the MED. Preferably, the cantilevered extension is not optional in this embodiment.

Figure 20:
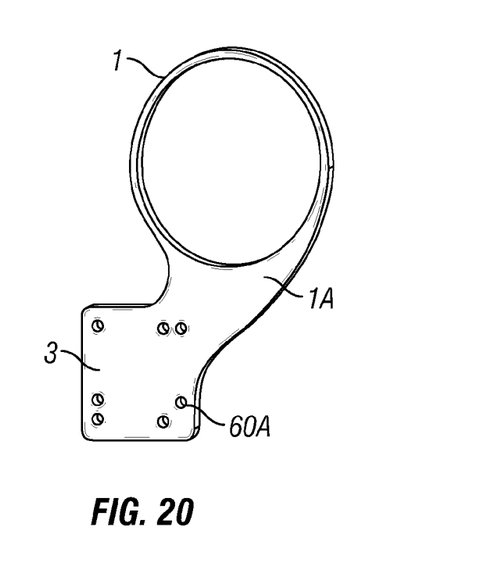
FIG. 20 shows a modified version of the MED mounting and positioning bracket that can be installed on the fuel level and/or oil level gauge or the analog clock in either LHD or RHD vehicles.
Figure 21:
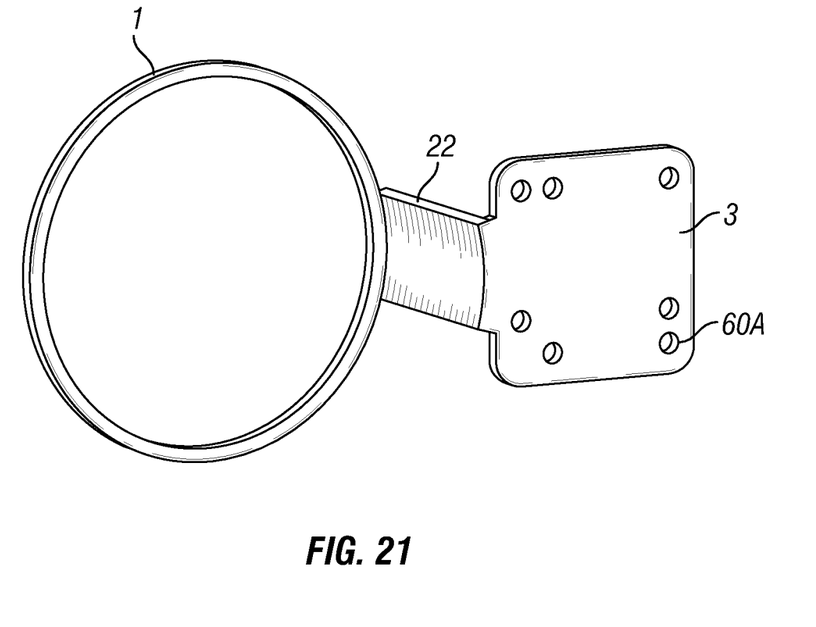
FIG. 21 shows another modified version of the MED mounting and positioning bracket that can be installed on the fuel level and/or oil level gauge or the analog clock in either LHD or RHD vehicles.

Preferably, in either of the latter two embodiments, the plate also is attached to an MED mounting platform (3 in FIGS. 20 and 21). As in FIG. 20, the MED mounting platform can be integral to (part of) the plate, or as shown in FIG. 21, the MED mounting platform can be attached to the plate, either in-line with the plate, or at any angle to the plate (shown in FIG. 21 as a 90 degree angle).

DETAILED DESCRIPTION OF THE INVENTION

The invention is a bracket assembly designed to fit the shape contours and legacy features of the dashboard of a classic Porsche 911 vehicle to provide a stable mounting and positioning platform for a portable mobile electronic device (MED) such as a smart phone (smartphone), portable global positioning system (GPS) navigation appliance, iPod or other mp3 player, satellite radio, or combination thereof in a driver-convenient location in the vehicle. A novel attribute of this invention is a design that enables secure, two-end attachment of the bracket assembly to the dashboard of the vehicle in a fashion that does not require conspicuous surface marring adhesives or drilling of dashboard damaging holes. One support arm brace design (shown in FIGS. 12-19) is an L-shaped flat surface beam with two "S" bends to accommodate dashboard contours and a downward L-bend at the front that creates a face plate that attaches to the MED bracket via two machine screws.

In one embodiment shown in FIGS. 12-19, the bracket support arm brace is an L-shaped flat surface beam with two S-bends that accommodate the design contours of the legacy dashboard of the classic Porsche 911 and an angled 90 deg. vertical bend on one arm end that creates a face plate that provides a surface to fasten the support arm brace to the canted MED mounting platform of the bracket. One arm of the brace runs parallel to the major axis of the vehicle's dashboard in a channel along the underside of the dashboard overhang. The other arm projects outward from the dashboard to connect to the MED mounting platform of the bracket. An S-bend at the intersection of the two arms of the brace allows for a vertical offset such that the arm running outward from the dashboard axis can clear the ridge of the dashboard overhang that creates the one edge of the channel. The bend angles of this S-bend can be 60-90 deg. The channel running arm of the brace is configured with a shallow 30-45 deg. S-bend at its far end to create a vertical offset connection tab that conforms to a recessed sheet metal contour in the dashboard frame where the pre-existing airbag cover bolt is located in certain Classic Porsche 911 vehicles. A slotted hole in the connection tab lines up with the pre-existing bolt location.

For later classic 911 Porsche models (1989-1998), the support brace is preferably anchored to the dashboard frame using a pre-existing bolt (for the passenger-side airbag cover) per the shallow S-bend tab at the far end of the brace. For the earlier classics (<1989) this bolt may not be present. For these earlier cars, the support brace design provides a way to anchor the brace to the dashboard. The legacy dashboard design and its frame create a sheet metal channel (15 in FIG. 2) under the dashboard overhang that provides a mating surface for attaching the support arm brace. Fastening can be mechanical as in drilling an "invisible" hole for a sheet metal screw or using double sided tape to adhere the upper surface of the support arm brace to the sheet metal surface under the dashboard overhang (not visible to the driver or MED user). The following detailed description of the invention references the accompanying figures. These figures illustrate, by way of example, specific embodiments of the invention. It is to be understood that the drawings are for the purposes of illustration and description only and are not intended as a definition of the limits of the invention. Other embodiments can be utilized and alterations can be made without departing from the scope of the present invention.

The materials used to make the bracket assembly can be varied, but are typically sufficiently stiff enough to resist excessive distortion under stress. Such materials can be, for example, metals and metal alloys such as aluminum, titanium, copper, stainless steel, carbon steel. Materials can also be used alone, or in combination with other metals or other plastics. Such plastics include commodity thermoplastics such as polypropylene, polyethylene and copolymers thereof and engineering thermoplastics such as acrylonitrile butadiene styrene (ABS), polycarbonate, polyamides (e.g. Nylon), polysulphone, polybutylene terephthalate (PBT), polyethylene terephthalate (PET). Plastics include composite materials e.g. plastics containing inorganic or organic fillers and/or high aspect ratio reinforcements e.g. fiberglass, carbon fibers, graphite fibers. The plastics can also be cross-linked by conventional means to control stiffness of the final part. Thermosets can also be used such as epoxy resins, phenolic resins including composites of these resins with fillers and reinforcements.

Figure 1:
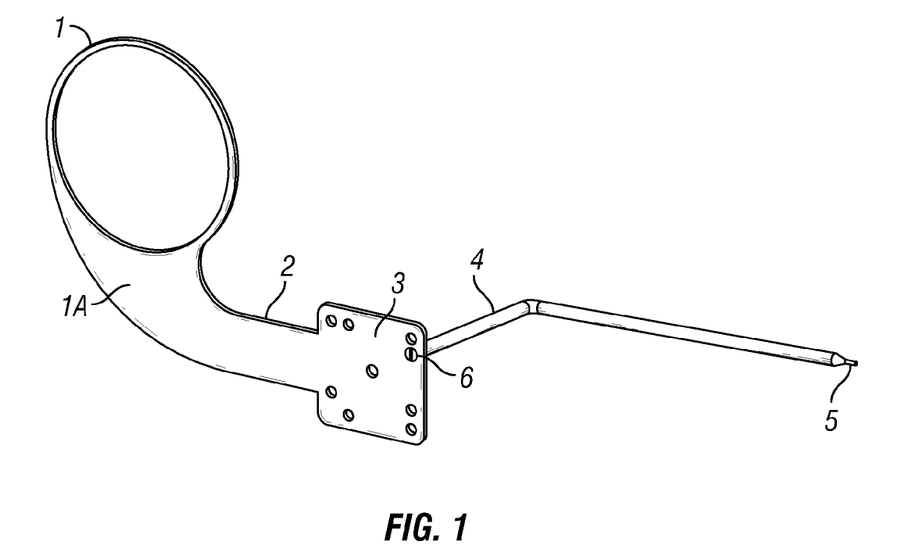
FIGS. 1 and 12 are schematic drawings of the MED mounting and positioning bracket assembly constructed in accordance with embodiments of the invention.
Figure 12:
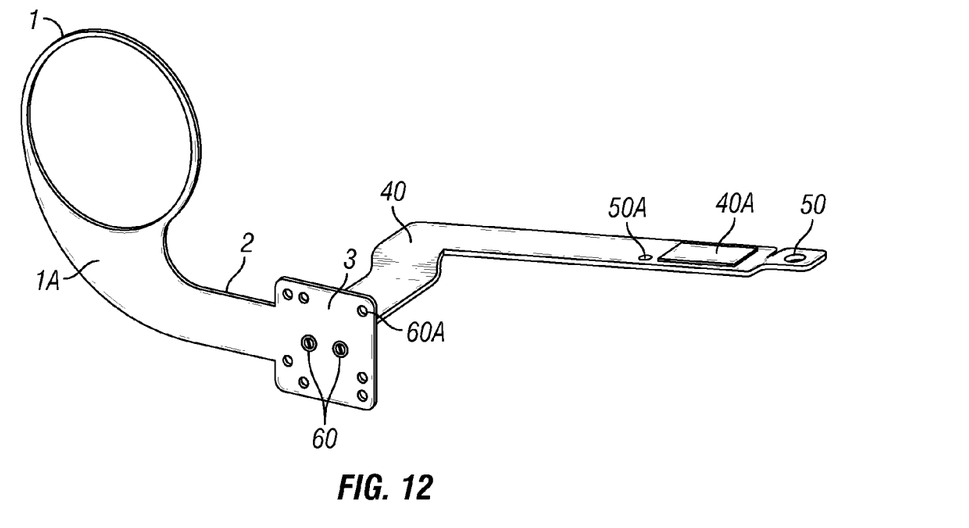
Figure 13:
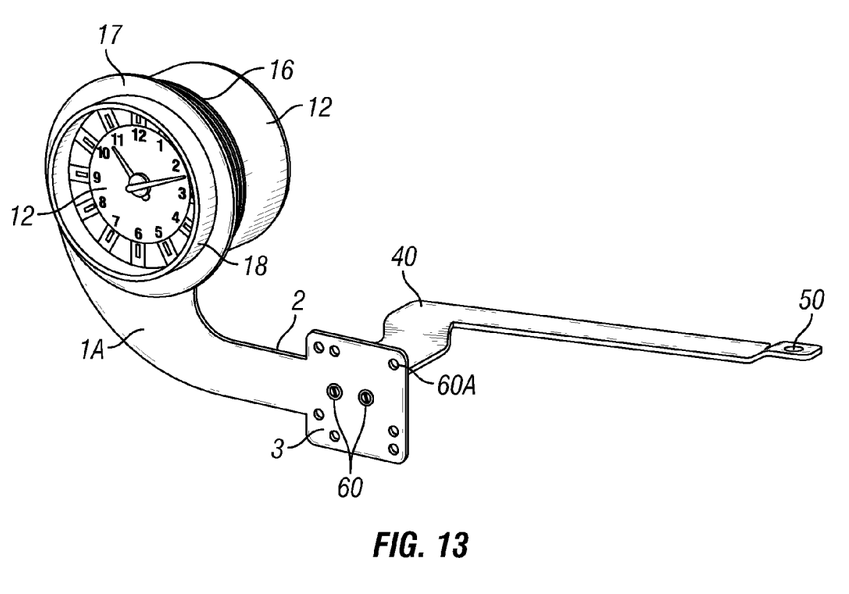
Figure 14:
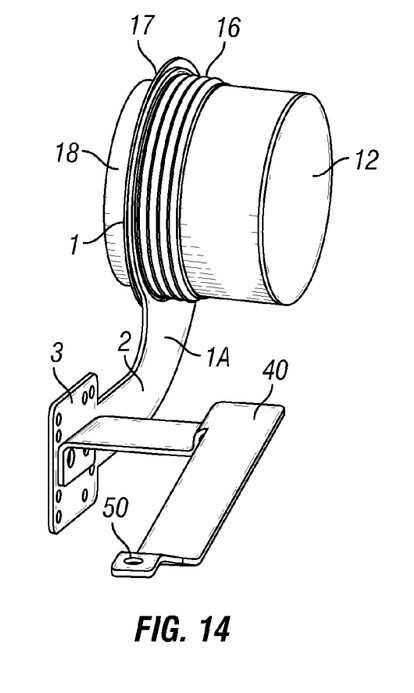

Presented each in FIGS. 1 and 12 is a schematic illustration of the MED mounting and positioning bracket assembly. Its various embodiments include constituent components: an annular ring 1 for securing one end of the bracket assembly to the vehicle's instrument housing panel; a plate 1A contiguous and/or connected to the annular ring; a cantilevered extension 2 contiguous and/or connected to the plate 1A for sideward positioning of MED placement; a MED mounting platform 3 contiguous and/or connected to the cantilevered extension 2 for fitting various adaptor plates and connector mechanisms to attach to MEDs and/or device holders (together, the annular ring, the contiguous plate, the cantilevered extension, and the mounting platform form a sideways "P" shape); and a bracket support arm brace 40 with connector tab 50 which fastens the other end of the bracket assembly to the dashboard and/or dashboard frame of the vehicle. The MED mounting platform 3 illustrated in FIG. 12 is equipped with two, near-center-line, countersunk holes 60 and face located holes 60A arranged in an industry standard AMPS pattern consisting of 4 holes configured in a rectangular array spaced at 1.188 in. by 1.813 in. (30 mm by 38 mm). In this exemplary embodiment, the AMPS array is shown in both a vertical and horizontal positioned pattern. The bracket support arm brace 40 can be affixed to the bracket by various means, welding, screw connection, bolting, riveting, adhesive, and the like. The exemplary embodiment of FIG. 12 shows two countersunk holes 60 in the MED mounting platform 3 to accept machine screws for connecting an L-shaped, flat surface, bent beam serving as a support arm brace 40 to the bracket mounting platform 3. The bracket support arm brace 40 is sized and configured to extend from the cantilevered extension 2 or MED mounting platform 3 to reach to the underside of the dash overhang 15 (shown in FIG. 2). The support arm brace 4 or 40 can include a positioning hole 5 or 50A to accommodate sheet metal screw attachment of the brace to the vehicle's dashboard frame metal channel that runs along the underside of the dashboard overhang 15. Attachment can also employ double-sided tape (40A in FIG. 12) to join the brace and metal channel surfaces.

Figure 2:
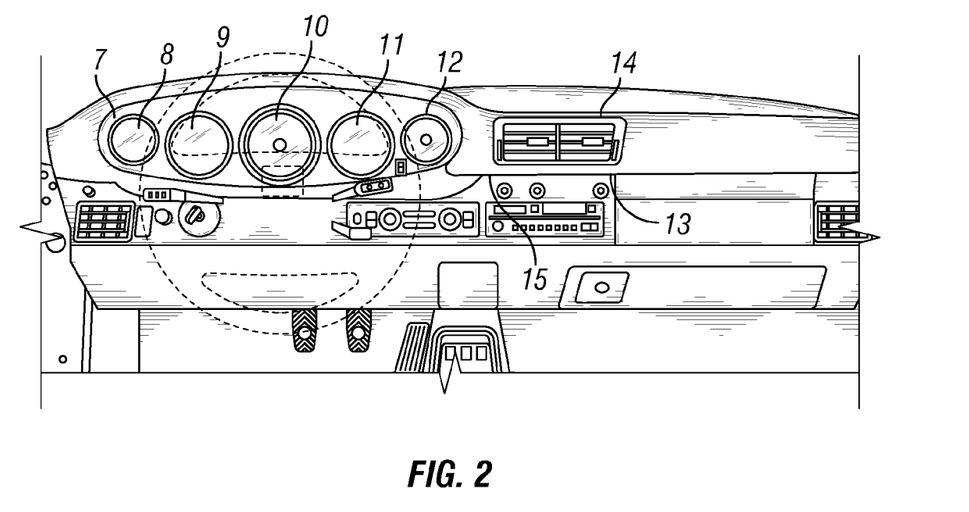
FIG. 2 is an illustration of the dashboard layout, instrument cluster configuration, and controls arrangement in a classic Porsche 911 (1995 model 993 in this case) showing the attachment points for securing the MED mounting & positioning bracket assembly to the dashboard of the vehicle. (This Figure is developed from a Porsche owner's manual entitled "Dashboard Assembly, Instruments" which makes the following copyright notation: © Dr. Ing. h.c. F. Porsche Aktiengesellschaft All rights reserved. Printed in Germany).

FIG. 2 presents an illustration of the dashboard design layout for left hand drive (LHD) vehicles which shows the location of dash attachment points for the MED mounting and positioning bracket assembly. The dashboard instrument housing panel 7 holds the fuel level and oil level gauge 8, the oil temperature and oil pressure gauge 9, the tachometer 10, the speedometer 11, and the analog clock 12. Right hand drive (RHD) vehicles use this same instrument configuration with the instrument housing panel 7 shifted to the right hand side of the vehicle. For LHD vehicles, the analog clock 12 is used to anchor one end of the bracket assembly. Alternatively, for RHD vehicles, the fuel level and oil level gauge 8 is used as one anchoring point for the bracket assembly. Symmetry of the dash instrument configuration is such that the radii of the fuel and oil level gauge 8 and the clock 12 are equal. Accordingly, in a preferred embodiment of the invention, the annular ring 1 of the MED mounting and positioning bracket assembly is sized such that either instrument 8 or 12 can serve as one anchoring point for the bracket assembly as described below. The other end of the bracket assembly, the support arm connector tab 5 (or 50 in FIG. 12) attaches to the dashboard at a location along the underside of the dashboard overhang 15. In a preferred embodiment for certain (>1989 model year vehicles), the support arm connector tab 5 (or 50 in FIG. 12) is fastened via an existing dashboard frame bolt 13 located under the dashboard overhang 15 just below the center vent 14 for LHD vehicles and symmetrically located in RHD vehicles. In vehicles without this existing dashboard frame bolt 13, the support arm connector tab 5 (or 50 in FIG. 12) can be eliminated and the support arm brace 4 or 40 can be fastened, mechanically, to the dashboard frame using, for example, a self-tapping sheet metal screw by drilling a hidden hole in the support arm brace 4 or 40 when fitted to the vehicle into the sheet metal channel surface of the dashboard frame under the dashboard overhang 15. Alternatively, the support arm brace 4 (or 40) can be attached to the vehicle using double sided tape (40A in FIG. 12) to secure the upper surface of the support arm brace 4 (or 40 in FIG. 12) to the sheet metal channel surface that runs along the underside of the dashboard overhang 15.

Figure 3:
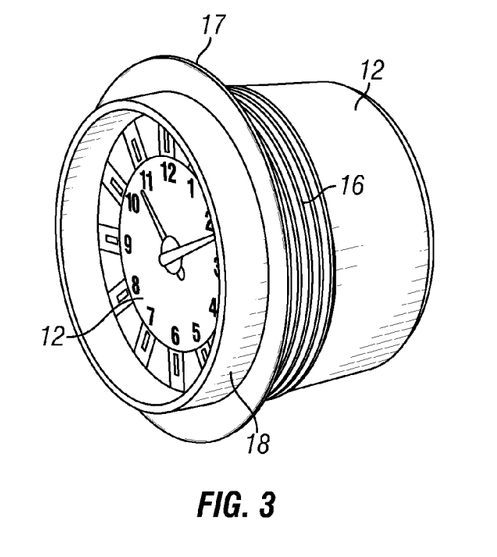
FIG. 3 shows a classic Porsche clock and ribbed rubber boot which provides one anchoring point for the MED mounting & positioning bracket.
Figure 4:
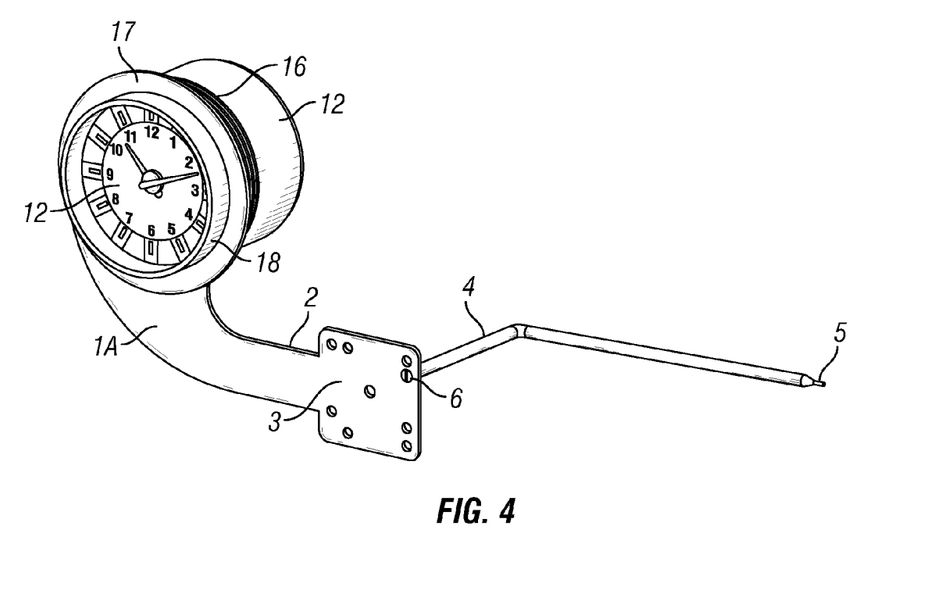
FIGS. 4 and 13 illustrate how the bracket assembly is secured by the Porsche clock with the annular ring of the bracket inserted behind the lip of the ribbed rubber boot which, in turn, holds the clock in position in the instrument housing panel of the classic Porsche 911 dashboard. Each figure shows a different brace arm attached to the bracket.
Figure 5:
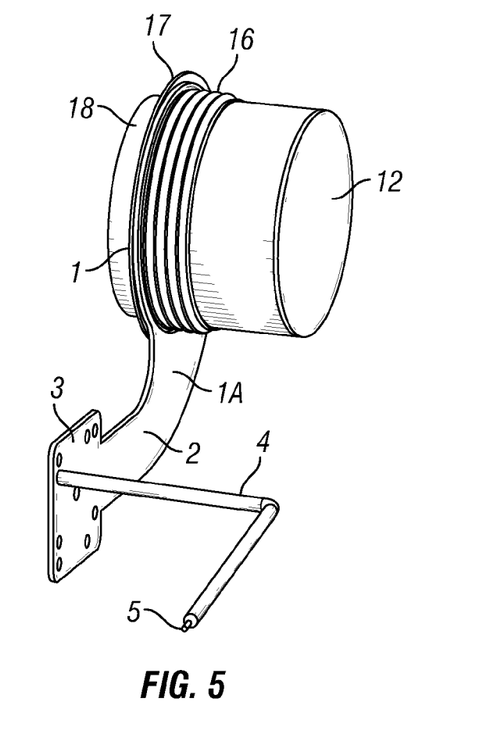
FIGS. 5 and 14 are a rear view of the bracket assembly (using two different brace arms) secured by the clock.

FIGS. 3-9 (and FIGS. 13, 14, 15-17) illustrate how the annular ring 1 end of the bracket assembly is secured to the vehicle dashboard instrument housing panel 7 via pressure and friction. FIG. 3 shows the analog clock 12 fitted with the ribbed rubber boot 16 that surrounds its circumference and is positioned just behind the clock's bezel 18. The fuel level and oil level gauge 8 is likewise surrounded by a ribbed rubber boot. Perspective FIGS. 4, 13 and 5, 14 show that the annular ring 1 of the bracket assembly is configured with a radius and thickness such that the ring fits tightly over the ribbed rubber boot 16 that surrounds either the analog clock 12 for LHD vehicles or the fuel level and oil level gauge 8 for RHD vehicles.

Figure 6:
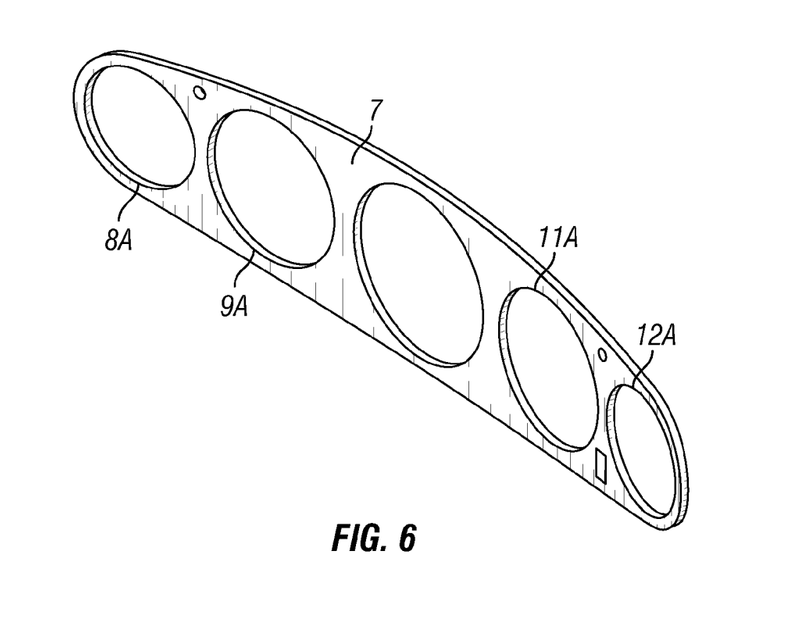
FIG. 6 is an illustration of the slightly concave instrument housing panel for a classic Porsche 911 with its symmetrical five-hole legacy design layout for holding the cluster of instruments for the vehicle.

The shape of the instrument housing panel 7 as illustrated in FIG. 6 is slightly concave to the driver. Because of this panel curvature, the faces of the extremity instrument openings; 8A for the fuel level and oil level gauge 8 and 12A for the analog clock 12, are somewhat canted to the major axis of the vehicle dash. Since these extremity instruments are used to hold the bracket assembly flush to the face of the instrument housing panel 7, the MED mounting and positioning platform 3, in turn, is also canted to the major axis of the vehicle dash. This desirable canted alignment of the bracket assembly provides for excellent driver-line-of-sight positioning for a mounted MED.

When installed in a left-hand drive vehicle, the annular ring of the bracket assembly 1 sits just behind the lip 17 of the ribbed rubber boot which together with the clock bezel 18 serves as a flange that holds the bracket assembly securely to the face of the instrument housing panel 7 by pressure and friction. The ribbed rubber boot holds the clock securely in position when inserted and pressed into the far right extremity opening 12A in the instrument housing panel 7 as shown in FIG. 6 and similarly for right-hand drive vehicles which uses the fuel level and oil level gauge 8 and right hand opening 8A of the instrument housing panel.

Figure 7:
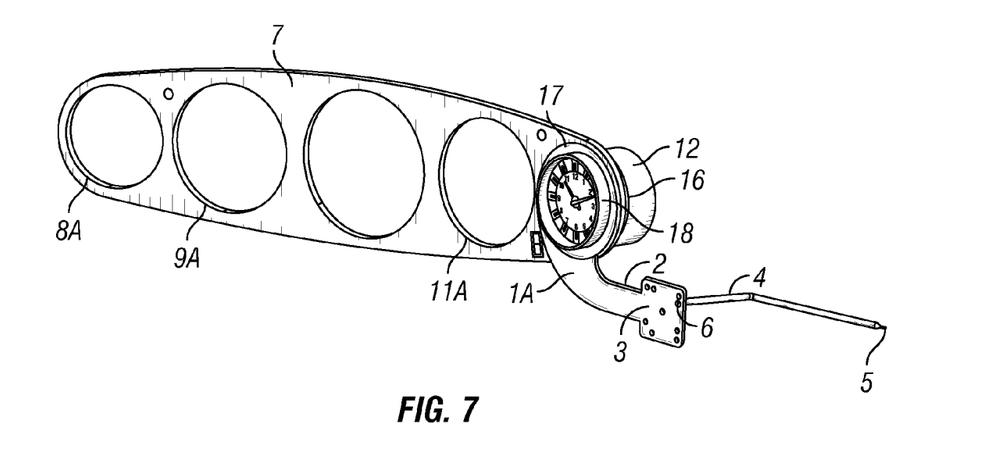
FIGS. 7 and 15 show the MED mounting and positioning bracket assembly sandwiched between the face of the instrument housing panel and the flange created by the clock bezel and lip of the ribbed rubber boot and installed on the instrument housing panel.
Figure 8:
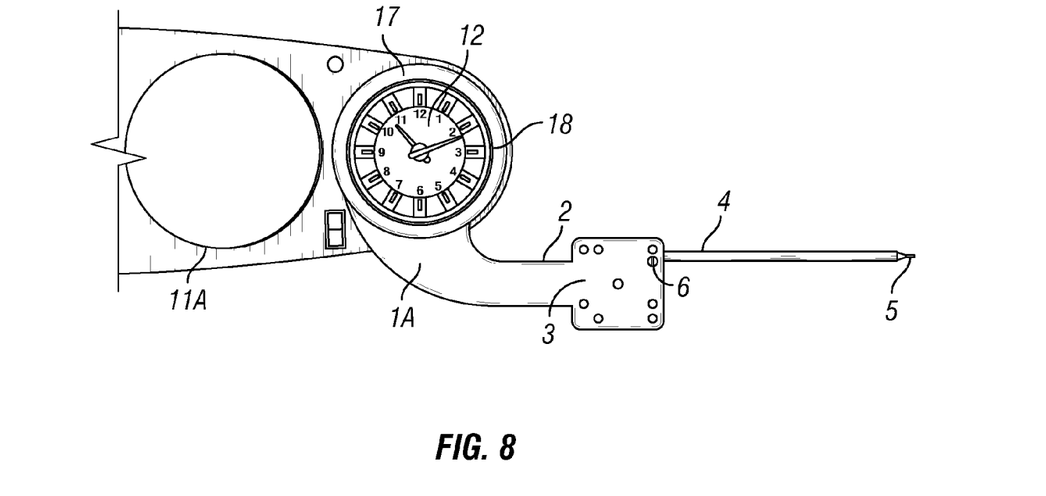
FIGS. 8 and 16 are a front view of the bracket assembly on the clock installed on the instrument housing panel.
Figure 9:
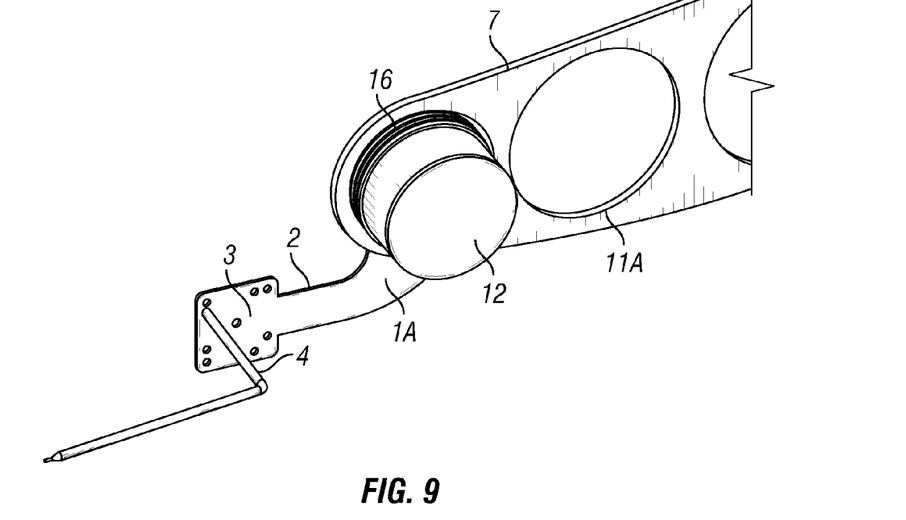
FIGS. 9 and 17 are a rear view of the bracket assembly on the clock installed on the instrument housing panel.
Figure 15:
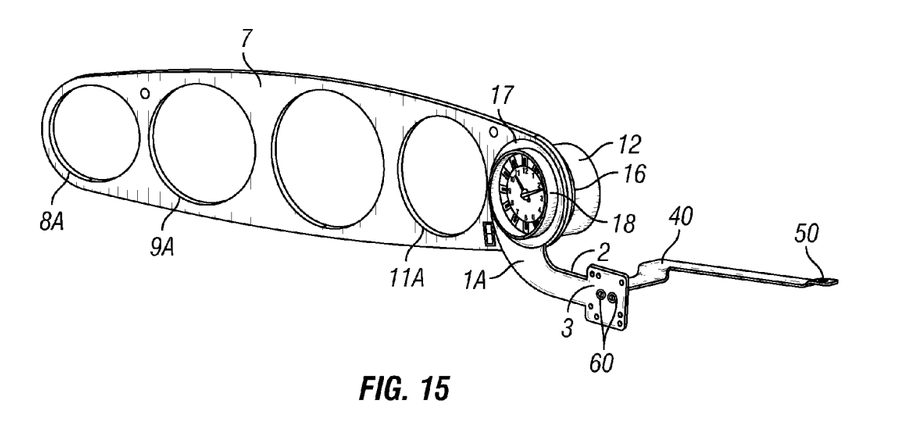
Figure 16:
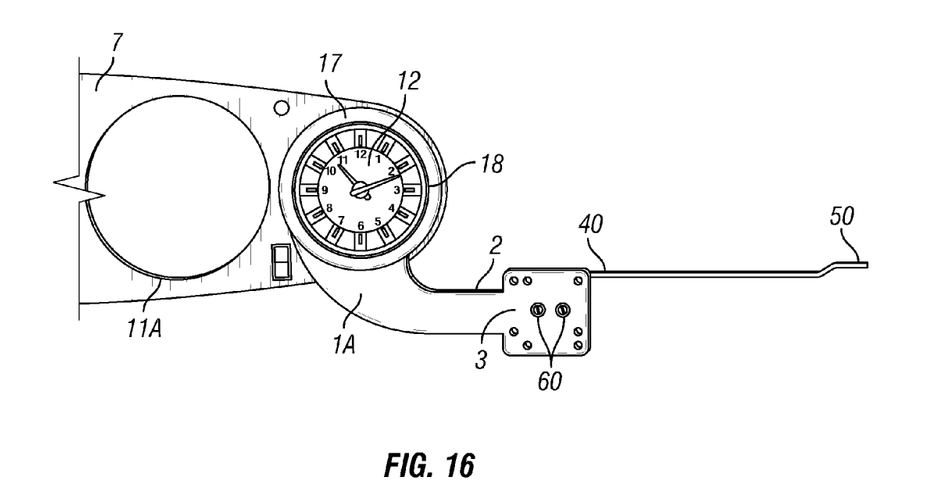
Figure 17:
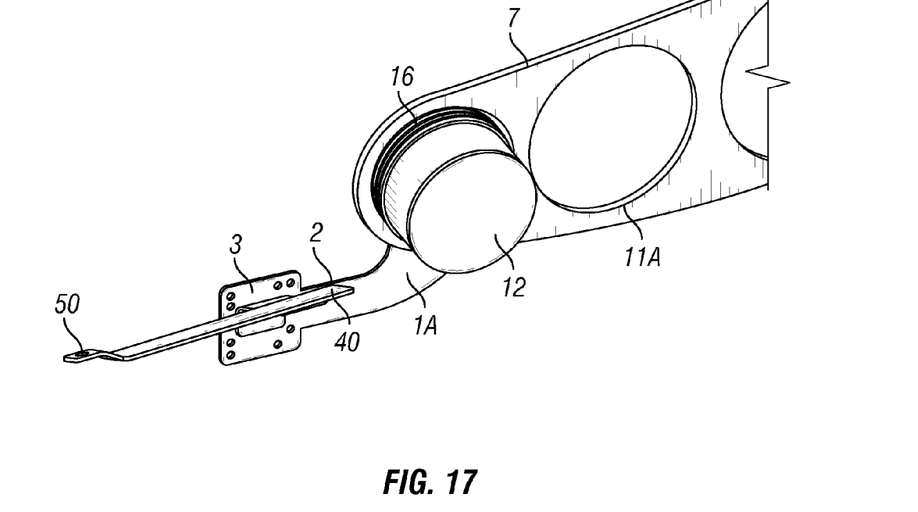

FIGS. 7 and 15 show the MED mounting and positioning bracket assembly secured to the instrument housing panel 7 for a left-hand drive vehicle with the annular ring 1 sandwiched between the flange created by the clock bezel 18 and lip of the ribbed rubber boot 16 on the clock 12 and the face of the instrument housing panel 7. FIGS. 8 and 16 show a front view and FIGS. 9 and 17 a rear view of this bracket assembly installation.

Figure 10:
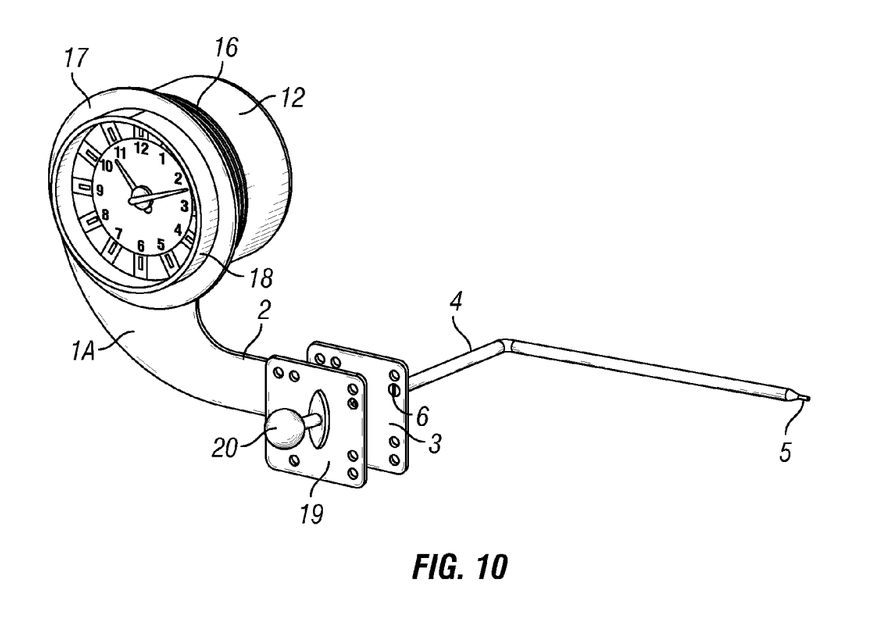
FIGS. 10 and 18 show how the bracket assembly's MED mounting platform with AMPS hole pattern platform accepts (for example) a 17 mm swivel ball adaptor plate used in attaching various MEDs or their holding docks or cradles.
Figure 18:
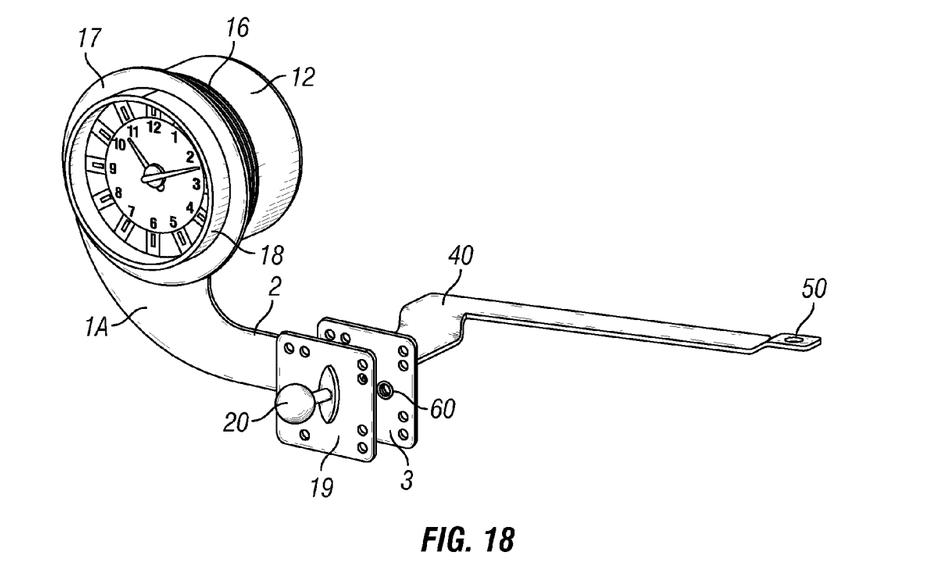

FIGS. 10 and 18 illustrate how the bracket assembly's MED mounting platform 3 configured with an industry standard AMPS hole pattern consisting of 4 holes located in a rectangular array spaced at 1.188 in. by 1.813 in. (30 mm by 38 mm) accepts, for example, an MED adaptor plate 19 equipped with a 17 mm swivel ball 20 used in ball and socket attachments of various MEDs or their holding docks or cradles.

Figure 11:
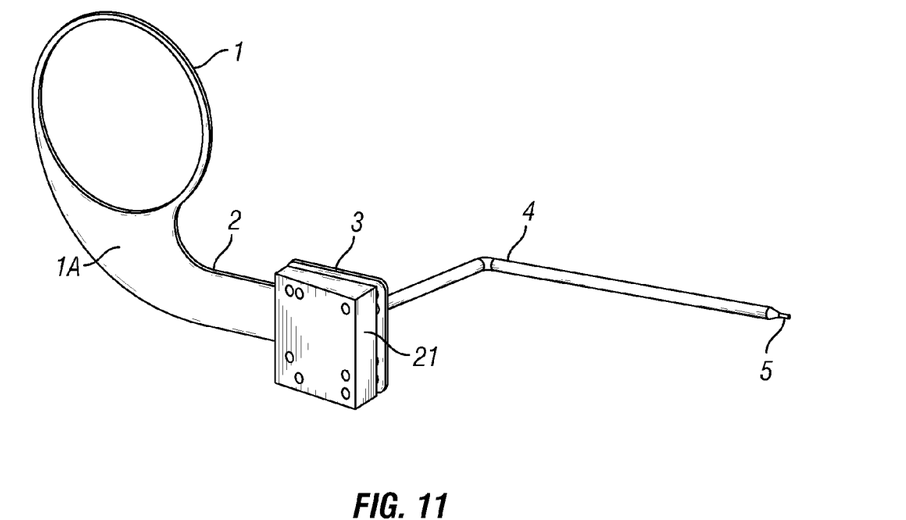
FIGS. 11 and 19 show the MED mounting and positioning bracket assembly equipped with a 15 deg. wedge to increase the cant of the bracket assembly's mounting and positioning platform.
Figure 19:
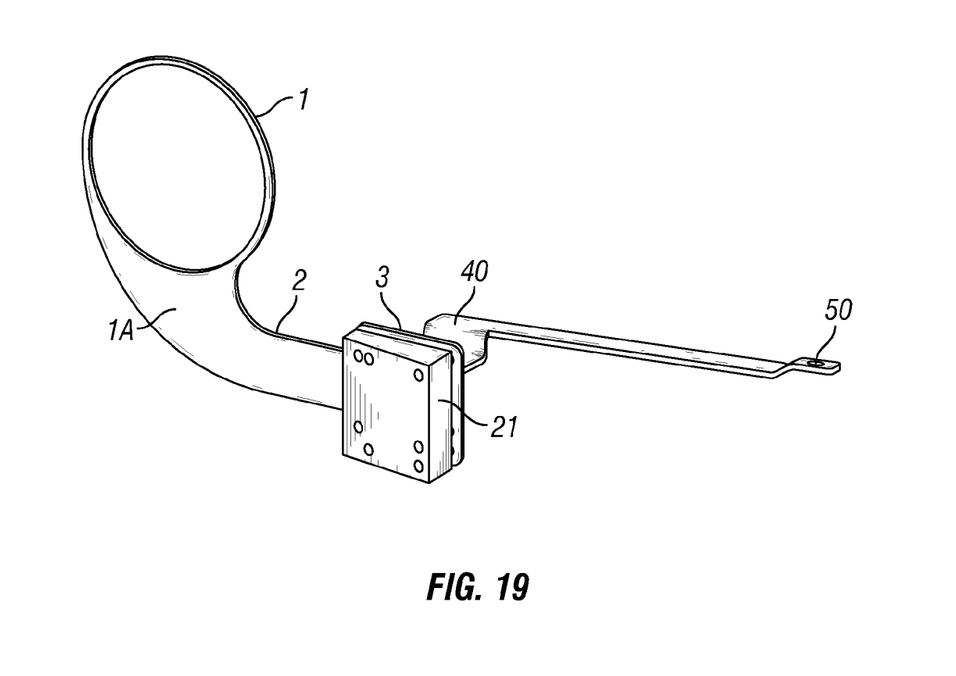

FIGS. 11 and 19 show that to further increase the canting of the bracket's MED support platform off the major axis of the dashboard, a wedge plate 21 can be inserted between the bracket assembly and the MED adaptor plate.

FIG. 20 illustrates a truncated version of the MED mounting and positioning bracket with: an annular ring 1 for securing the bracket assembly to the vehicle's instrument housing panel; a plate 1A contiguous and/or connected to the annular ring; and a MED mounting platform 3 contiguous and/or connected to plate 1A for fitting various adaptor plates and connector mechanisms to attach to MEDs and/or device holders. In this version of the bracket, the cantilevered extension 2 is absent which allows for installation in the constrained space to the left of the steering wheel on the fuel level and/or oil level gauge 8 in Left Hand Drive (LHD) vehicles and to the right of the steering wheel on the analog clock 12 in Right Hand Drive (RHD) vehicles. Because there is no under dashboard sheet metal channel in this location, this bracket installation does not incorporate a support arm brace. Of course, this truncated bracket could also be positioned on the clock for LHD vehicles and/or the fuel level and/or oil level gauge in RHD vehicles.

FIG. 21 illustrates another version of the MED mounting and positioning bracket with: an annular ring 1 for securing the bracket assembly to the vehicle's instrument housing panel; a plate 22 contiguous and/or connected to the annular ring; and a MED mounting platform 3 contiguous and/or connected to plate 22 for fitting various adaptor plates and connector mechanisms to attach to MEDs and/or device holders. In this version of the bracket, the cantilevered extension 2 is absent. In the embodiment shown in FIG. 21, plate 22 is a cylindrical arc shaped plate projecting outward from the plane of the annular ring 1 to the MED mounting platform 3. It can be placed on or attached to the annular ring along a portion of the annular ring circumference, usually within an arc span of about 10 to about 180 degrees of the total 360 degrees of the ring circumference, but preferably the arced plate 22 is placed on about 15 to about 60 degrees of the annular ring arc, more preferably from about 25 to about 35 degrees of the annular ring arc. In FIG. 21, the plate 22 is shown extending outward from the plane of the annular ring at about a 90 degree (perpendicular) angle. In other embodiments, plate 22 can project outward from the plane of the annular ring at acute or oblique angles up to about 30 degrees from perpendicular. Generally, however, plate 22 is positioned as shown in FIG. 21. In FIG. 21, the MED mounting platform 3 is shown cantilevered from plate 22 at a 90 degree (perpendicular) angle to the outward projecting axis of plate 22. In other embodiments, the MED mounting platform can be configured at acute or oblique angles to the outward projecting axis of plate 22 up to about 30 degrees from perpendicular. In another embodiment of this bracket design, the MED Mounting platform 3 can be shifted sideways in position away from the centerline of the annular ring 1 by incorporating a cantilevered extension between the cylindrical arc plate 22 and the MED mounting platform 3. Plate 22 need not be uniform in its projected arc width or thickness; that is, the plate may be relatively wide or thick at the attachment point to the annular ring, and then narrow or thin as it meets the MED mounting platform 3 (or vice versa). Because there is also no under dashboard sheet metal channel in this location (as in FIG. 20), this bracket installation does not incorporate a support arm brace. This bracket can be positioned on the clock and/or the fuel level and/or oil level gauge for either LHD or RHD vehicles.

Ball and socket attachment of an MED holding dock or cradle allows for multi-axis tilt and/or cant adjustment of MED screen position for fine tuning its driver-line-of-site visibility.

As described in the background section, because of the continuity in dashboard shape, configuration, and instrument housing panel arrangement throughout the thirty three year production of classic 911s, the design of the MED mounting and positioning bracket systems described herein work with essentially all classic Porsche 911s. Tweaks in certain bracket dimensions may be required for the earliest vehicles but, in general, the design fits all classic air cooled Porsche 911s from about the 1970 models through to the last of the 1998 993 model vehicles.

In a preferred embodiment of the MED mounting and positioning bracket systems described herein, the annular ring 1 of these systems is designed to attach to either of the extremity instruments, the fuel level and oil level gauge 8 or the analog clock 12 in the instrument housing panel 7 of the classic Porsche 911. In another embodiment of the invention, the bracket assembly annular ring 1 can be sized with a larger radius such that it fits over the ribbed rubber boot that surrounds either the larger diameter oil temperature and oil pressure gauge 9 or the speedometer 11. In this embodiment, the cantilevered extension 2 of the bracket assembly is lengthened to position the MED mounting platform 3 in a driver-convenient location. As described previously, the annular ring is held in place by pressure and friction as it sits sandwiched between the flange created by gauge bezel and lip of the ribbed rubber boot and the face of the instrument housing panel 7 when the gauges 9 or 10 are pressed into openings 9A or 11A shown in FIG. 6.

In some embodiments of the invention, the horizontal centerline of the MED mounting platform 3 is configured to reside either above or below the horizontal centerline of the bracket assembly's cantilevered extension 2 thus raising or lowering the position of the mounted MED relative to the driver's line-of-sight.

In another embodiment of the invention, canting of the MED mounting support platform to the major axis of the vehicle dash is achieved by implementing a vertical bend of the cantilevered extension 2 constituent of the bracket assembly.

In a further embodiment of the invention, affixing just the annular ring 1 of the bracket to the instrument housing panel 7 may be sufficient to provide stability and rigidity for secure MED mounting without need for a support arm brace 4. In another embodiment, a MED mounting platform may be positioned and secured using just the support arm 4 without the annular ring attachment.

TABLE 1

Listing of Figure Label Items

| Label | Description |
|---|---|
| 1 | Annular ring |
| 1A | Plate |
| 2 | Cantilevered Extension |
| 3 | MED mounting platform |
| 4/40 | Bracket support arm brace |
| 5/50 | Connector tab |
| 6/60 | Countersunk holes |
| 7 | Dashboard instrument housing panel |
| 8 | Fuel level/oil level gauge |
| 9 | Oil temperature/oil pressure gauge |
| 10 | Tachometer |
| 11 | Speedometer |
| 12 | Analog clock |
| 13 | Dashboard frame bolt |
| 14 | Center vent |
| 15 | Dash overhang (Sheet metal channel underneath) |
| 16 | Ribbed rubber boot |
| 17 | Ribbed rubber boot lip |
| 18 | Clock bezel |
| 8A | Left extremity opening on instrument panel (for fuel level/oil level gauge) |
| 9A/11A | Instrument openings (for, respectively, oil temperature/oil pressure gauge 9 and speedometer 11) |
| 12A | Right extremity opening (for analog clock) |
| 19 | MED adaptor plate |
| 20 | Swivel ball |
| 21 | Wedge plate |
| 22 | Cylindrical arc plate |
| 40A | Double sided tape |
| 50A | Positioning hole |
| 60A | Face located holes arranged in AMPS pattern (in FIG. 12) |

While the invention has been described and illustrated in accordance with particular embodiments, it is to be understood that there are many variations and modifications to the configuration of the MED mounting and positioning bracket assembly which may be made by those skilled in the art. Accordingly, the invention is not restricted to the details of the forgoing embodiments; it is limited only by the spirit and scope of the claims.

I claim:

1. A non-invasive, secure, stable attachment device for mounting a mobile electronic device (MED) to a dashboard of a vehicle without requiring surface marring adhesives or drilling of holes, said device comprising:
    a) a bracket assembly securing two-end, mechanical anchoring of a MED mounting platform to the dashboard,
    b) a first fastening mechanism for one end of the bracket assembly which uses pressure and friction achieved by sandwiching the bracket assembly between a face of an instrument housing panel of the vehicle and a lip of a circumferential ribbed rubber boot used in press fitting and holding at least one cylindrical vehicle instrument securely in a circular opening in the vehicle's instrument housing panel,
    c) a second fastening mechanism for the opposite end of the bracket assembly, which mechanically attaches a bracing support arm connecting the bracket assembly to the dashboard and/or dashboard frame using at least one pre-existing vehicle bolt, and
    d) a MED mounting platform configured with a hole or pattern of holes to accept various adaptor plates and connector mechanisms to attach to MEDs and/or device holders/cradles.

2. The device of claim 1 wherein the first fastening mechanism is an annular ring of the bracket assembly.

3. The device of claim 2 wherein the annular ring of the bracket assembly is fit to a clock, or a fuel level and/or oil level gauge of the vehicle.

4. The device of claim 1 wherein the MED mounting platform is fitted with a spacer wedge increasing platform canting relative to a major horizontal axis of the dashboard.

5. The device of claim 1 wherein the bracket assembly is removable from the vehicle without evidence of prior installation.

6. The device of claim 1 with a MED mounting mechanism configured to couple and/or remove a portable MED.

7. A bracket assembly for mounting, positioning, and supporting a mobile electronic device (MED) in a vehicle, the bracket assembly comprising:
   a) an annular ring for securing the bracket assembly to an instrument of an instrument housing panel of the vehicle, wherein the instrument is fitted with a ribbed rubber boot that surrounds its circumference,
   b) a plate contiguous and connected to the annular ring that conforms to design contours and configuration of a dashboard of the vehicle,
   c) a cantilevered extension contiguous and connected to the plate for sideward positioning of MED placement,
   d) a MED mounting platform contiguous and connected to the cantilevered extension, and
   e) a support arm connecting the bracket assembly to the dashboard or dashboard frame of the vehicle to brace the MED mounting platform, reinforce bracket stability, constrain bracket movement, and dampen vibration of the mounted MED.

8. The assembly of claim 7 wherein the instrument housing panel comprises at least one circular opening to accommodate a cylindrical vehicle instrument.

9. The assembly of claim 7 wherein the annular ring of the bracket assembly concentrically fits the circumference of at least one cylindrical vehicle instrument and sits behind a protruding rim of said instrument and is held securely to the face of the instrument housing panel by pressure and friction created when the cylindrical vehicle instrument is pressed into a circular opening in the instrument housing panel.

10. The assembly of claim 7 wherein the annular ring of the bracket assembly is fit to a clock, a fuel level gauge, or an oil level gauge.

11. The assembly of claim 7 wherein the MED mounting platform is configured with a hole or pattern of holes to accept adaptor connectors for attaching various MEDs and/or MED docking holders/cradles.

12. The assembly of claim 7 wherein the MED mounting platform is fitted with a spacer wedge to increase platform canting relative to a major horizontal axis of the dashboard.

13. The assembly of claim 7 wherein the bracket support arm or brace is mechanically attached to the vehicle dashboard or dashboard frame using a bolt, screw, or rivet, or double-sided tape.

14. The assembly of claim 7 which wires the MED to the electronic systems of the vehicle for powering the MED and/or sound interaction using an integrated audio component of the vehicle.

15. The bracket assembly of claim 7 wherein the annular ring is an anchoring point for the bracket assembly and the support arm connects and anchors the bracket assembly to the dashboard or a dashboard frame of the vehicle.

16. In a bracket assembly used to mount a mobile electronic device (MED) in a vehicle, the bracket assembly comprising an annular ring integral to and securing the bracket assembly to an instrument housing panel of the vehicle, the improvement comprising:
   a) a plate contiguous and connected to the annular ring that conforms to a dashboard design contour and configuration of the vehicle,
   b) a cantilevered extension contiguous and connected to the plate for generally sideward positioning or placement of the MED,
   c) a MED mounting platform contiguous and connected to the cantilevered extension,
   d) wherein the annular ring is an anchoring point for the bracket assembly which uses pressure and friction achieved by sandwiching the bracket assembly a face of an instrument housing panel of the vehicle and a lip of a circumferential ribbed rubber boot used in press fitting and holding at least one cylindrical vehicle instrument securely in a circular opening in the vehicle's instrument housing panel, and
   e) optionally, a support arm connecting and anchoring the bracket assembly to the dashboard or a dashboard frame of the vehicle.

17. In a bracket assembly used to mount a mobile electronic device (MED) in a vehicle, the bracket assembly comprising an annular ring integral to and securing the bracket assembly to an instrument housing panel of the vehicle, the improvement comprising
   attaching a plate to the annular ring, wherein the annular ring and the plate conforms to a dashboard design contour and configuration of the vehicle, wherein the plate projects outward from a plane of the annular ring at acute or oblique angles up to about 30 degrees from perpendicular to the plane, and wherein the annular ring is an anchoring point for the bracket assembly which uses pressure and friction achieved by sandwiching the bracket assembly between a face of the instrument housing panel of the vehicle, and a lip of a circumferential ribbed rubber boot used in press fitting and holding at least one cylindrical vehicle instrument securely in a circular opening in the vehicle's instrument housing panel.

18. The bracket assembly of claim 17 further comprising a cantilevered extension contiguous and connected to the plate for generally sideward positioning or placement of the MED.

19. The bracket assembly of claim 17 further comprising sizing the annular ring such that the annular ring has an inner diameter less than and within 0.5 to about 1.25 percent of an outer diameter of the instrument.

20. The bracket assembly of claim 19 further comprising a cantilevered extension contiguous and connected to the plate for generally sideward positioning or placement of the MED.

* * * * *